(12) United States Patent
Suh

(10) Patent No.: US 7,571,948 B2
(45) Date of Patent: Aug. 11, 2009

(54) APPARATUS FOR PREVENTING VEHICLE TRAY FROM BEING OPENED BY INERTIA LOAD

(75) Inventor: Chang Soo Suh, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/942,567

(22) Filed: Nov. 29, 2007

(65) Prior Publication Data
US 2009/0038225 A1  Feb. 12, 2009

(30) Foreign Application Priority Data
Aug. 6, 2007  (KR) .................. 10-2007-0078591

(51) Int. Cl.
*B60N 3/12* (2006.01)
*E05B 15/02* (2006.01)
(52) U.S. Cl. ............. 296/37.12; 296/37.8; 292/DIG. 22
(58) Field of Classification Search ................ 296/37.1, 296/37.8, 37.9, 37.12–37.16; 292/341.15, 292/341.17, 128, DIG. 4, DIG. 17, DIG. 22
See application file for complete search history.

(56) References Cited

U.S. PATENT DOCUMENTS

| | | | | |
|---|---|---|---|---|
| 4,552,399 A | * | 11/1985 | Atarashi ................... | 296/37.12 |
| 4,660,881 A | * | 4/1987 | Komeya et al. ............. | 296/37.9 |
| 5,052,728 A | * | 10/1991 | Fukumoto .................. | 292/106 |
| 5,603,540 A | * | 2/1997 | Shibao .................... | 292/341.15 |
| 6,702,354 B2 | * | 3/2004 | Galijasevic ................ | 296/37.1 |
| 6,786,523 B2 | * | 9/2004 | Ogura ..................... | 296/24.34 |
| 6,808,214 B2 | * | 10/2004 | Sato et al. ............... | 292/341.15 |
| 7,121,605 B2 | * | 10/2006 | DePue et al. .............. | 296/37.12 |
| 7,226,102 B2 | * | 6/2007 | Yang ...................... | 296/37.12 |
| 2005/0082864 A1 | * | 4/2005 | Park et al. ............... | 296/37.12 |
| 2006/0055196 A1 | * | 3/2006 | Yamada .................... | 296/37.12 |

FOREIGN PATENT DOCUMENTS

| | | | | |
|---|---|---|---|---|
| EP | 0561278 | * | 9/1993 | ............ 296/37.12 |
| EP | 0561332 | * | 9/1993 | ............ 296/37.12 |

* cited by examiner

*Primary Examiner*—Glenn Dayoan
*Assistant Examiner*—Gregory Blankenship
(74) *Attorney, Agent, or Firm*—Morgan, Lewis & Bockius LLP

(57) ABSTRACT

An apparatus for preventing a lid from being undesirably opened. The lid is rotatably coupled to a vehicle tray. The apparatus includes a spring provided under the vehicle tray; and a stopper provided under the vehicle tray. The stopper is coupled at one end to the spring, so that, when a force greater than a predetermined force is applied to the stopper in a direction away from the spring, the stopper overcomes the elastic force of the spring and slides to a position at which it prevents the lid from opening. One-way sliding sawteeth are provided on a lower surface of the vehicle tray and on an upper surface of the stopper. The sawteeth engage with each other when the stopper slides to the position at which it prevents the lid from opening, such that the stopper is prevented from returning to its original position.

4 Claims, 1 Drawing Sheet

APPARATUS FOR PREVENTING VEHICLE TRAY FROM BEING OPENED BY INERTIA LOAD

This application claims priority to Korean Application No. 10-2007-0078591, filed on Aug. 6, 2007, the disclosure of which is incorporated herein by reference.

BACKGROUND OF THE INVENTION

(1) Field of the Invention

The present invention relates to an apparatus for preventing a vehicle tray from being undesirably being opened by inertia.

(2) Description of the Related Art

Trays for storing objects therein, such as ashtrays and coin trays, are typically provided in vehicles. Generally, a lid is provided on the tray. The lid has a rotating shaft and is elastically biased in the closed direction by a torsion spring. Furthermore, a locking structure, such as a clamp, may be provided to keep the lid closed. When a user pulls the lid, applying sufficient force to overcome the force of the torsion spring, the lid is opened.

When the vehicle either starts or stops suddenly, depending on the orientation of the tray, the lid may be undesirably opened by inertia, and objects may escape from the tray.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An apparatus for preventing a lid from being undesirably opened. The lid is rotatably coupled to a vehicle tray. The apparatus includes a spring provided under the vehicle tray; and a stopper provided under the vehicle tray. The stopper is coupled at one end to the spring, so that, when a force greater than a predetermined force is applied to the stopper in a direction away from the spring, the stopper overcomes the elastic force of the spring and slides to a position at which it prevents the lid from opening. One-way sliding sawteeth are provided on a lower surface of the vehicle tray and on an upper surface of the stopper. The sawteeth engage with each other when the stopper slides to the position at which it prevents the lid from opening, such that the stopper is prevented from returning to its original position.

The other end of the stopper may include a protrusion that engages with a recess on the tray. The sawteeth of the stopper may be ahead of the protrusion of the stopper.

The apparatus may also include a cover below the stopper to cover the stopper, the cover being open at front and rear ends thereof.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings, which are given hereinbelow by way of illustration only, and thus are not limitative of the present invention, and wherein.

Figure 1:
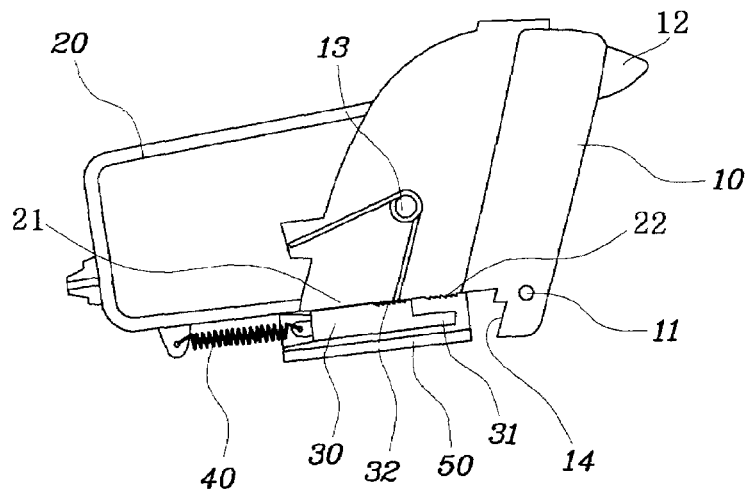
FIG. 1 is a schematic view of an apparatus according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter reference will now be made in detail to a preferred embodiment of the present invention, examples of which are illustrated in the accompanying drawings and described below. While the invention will be described in conjunction with an exemplary embodiment, it should be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

A lid 10 is provided on a vehicle tray 20. The lid 10 has a rotating shaft 11 and is elastically biased by a torsion spring 13 in the closed direction of the vehicle tray 20. When a user pulls the lid 10 using a handle 12, applying force sufficient to overcome that of the torsion spring 13, the lid 10 is opened.

A spring 40 is provided at the front end under the lower surface 21 of the tray 20. The spring 40 is extendable and contractible in the longitudinal direction of the vehicle, i.e. left and right in FIG. 1.

A stopper 30 is placed behind (right in FIG. 1) the spring 40 on substantially the same line as the spring 40. In detail, the stopper 30 is coupled at a first end thereof to the spring 40, so that backward movement thereof is restricted by the spring 40. However, when excessive inertia is applied to the stopper 30, for example, by a quick start of the vehicle, the stopper 30 overcomes the elastic force of the spring 40 and moves under the lid 10, which is disposed behind the stopper 30. The elastic modulus of the spring 40 and the weight of the stopper 30 can be appropriately determined by a person of ordinary skill in the art depending on the particular application.

Figure 2:
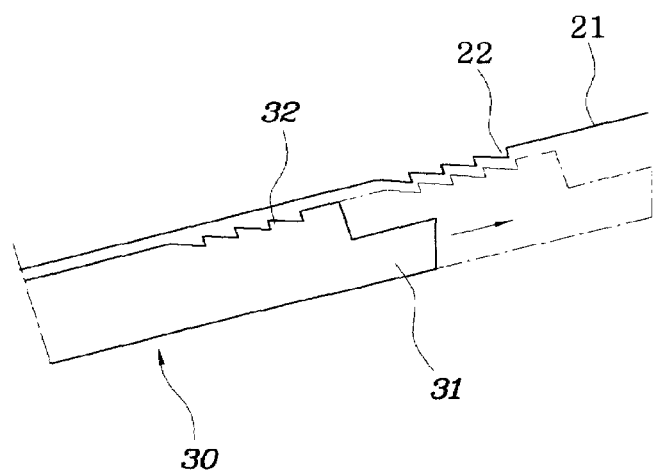
FIG. 2 is a view illustrating a one-way sliding sawtooth structure of the apparatus of FIG. 1.

Referring to FIGS. 1 and 2, one-way sliding sawteeth 22 and 32 are provided in the lower surface 21 of the tray 20 and the upper surface of the stopper 30. Ordinarily, the sawteeth 22 of the tray 20 are disposed behind the sawteeth 32 of the stopper 30, so that only when the stopper 30 moves backwards can the sawteeth 22 and 32 engage with each other.

Here, the term "one-way sawtooth structure" means a structure such that two bodies can slide with respect to each other only in one direction but are prevented from sliding in the reverse direction. In the illustrated embodiment, the sawteeth can cross over each other when the stopper 30 moves backwards, but prevent the stopper 30 from moving forwards. Although a representative example of a one-way sawtooth structure is illustrated in FIG. 2, the detailed shape illustrated is not intended to be limiting.

When inertia is applied to the apparatus, the stopper 30 moves below the lid 10 and pushes the lower end of the lid 10 such that the lid 10 is prevented from being rotated around its axis 11 and opened.

A protrusion 31 is provided on the second end of the stopper 30. Preferably, the sawteeth 32 are disposed ahead of the protrusion 31. Due to this, the interference of the backward movement of the stopper 30 with the sawtooth structure is minimized, and the interference of the stopper 30 with the lid 10 is minimized. As well, the utilization of space is increased. A stepped part 14 corresponding to the protrusion 31 of the stopper 30 may be provided in the lower end of the lid 10. When the stopper 30 moves backwards, the protrusion 31 of the stopper 30 presses the stepped part 14 of the lid 10.

After the stopper 30 has moved backwards, the stopper 30 cannot return to its original position due to the sawtooth structure, so that the lid 10 cannot be opened. To release this state, the sawteeth 22 and 32 must be forcibly separated from each other, at which time the stopper 30 returns to its original position using the elastic restoring force of the spring 40.

Figure 3:
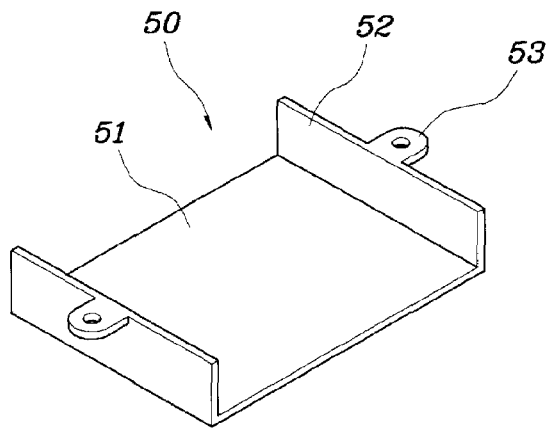
FIG. 3 is a perspective view of a cover that covers a stopper of the apparatus of FIG. 1.

Meanwhile, as shown in FIG. 3, a cover 50, which covers the stopper 30, is provided below the stopper 30. The cover 50 includes a base part 51, sidewall parts 52 and fastening parts 53, which extend from the sidewall parts 52 and couple the cover 50 to the lower surface 21 of the tray 20. Furthermore, a rail structure, such at that typically used for extracting and retracting drawers, may be provided between each sidewall part 52 of the cover 50 and each sidewall of the stopper 30 such that the stopper 30 can smoothly slide in the longitudinal direction and a predetermined gap can be maintained between the lower surface 21 of the tray 20 and the upper surface of the stopper 30.

As described above, the vehicle tray opening prevention apparatus according to the present invention can prevent a vehicle tray from being undesirably opened by inertia and, thus, fundamentally prevent the contents in the vehicle tray from spilling out from the vehicle tray.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An apparatus for preventing a lid from being undesirably opened, the lid being rotatably coupled to a vehicle tray, the apparatus comprising:
    a spring provided under the vehicle tray;
    a stopper provided under the vehicle tray, and coupled at a first end thereof to an end of the spring, so that, when a force greater than a predetermined force is applied thereto in a direction away from the first end of the stopper, the stopper overcomes an elastic force of the spring and slides to a position at which it prevents the lid from opening; and
    one-way sliding sawteeth provided on a lower surface of the vehicle tray and an upper surface of the stopper, the one-way sliding sawteeth engaging with each other when the stopper slides to the position, such that the stopper is prevented from returning to an original position thereof.

2. The apparatus as set forth in claim 1, wherein a second end of the stopper comprises a protrusion configured to engage with a recess on the tray.

3. The apparatus as set forth in claim 2, wherein the one-way sliding sawteeth provided on the stopper are disposed in a direction toward the first end of the stopper with respect to the protrusion of the stopper.

4. The apparatus as set forth in claim 1, further comprising:
    a cover provided below the stopper to cover the stopper, the cover being open at front and rear ends thereof.

* * * * *